(12) United States Patent
Sugaya et al.

(10) Patent No.: US 11,162,829 B2
(45) Date of Patent: Nov. 2, 2021

(54) MULTILAYER BODY THAT INCLUDES PIEZOELECTRIC BODY

(71) Applicant: Panasonic Intellectual Property Management Co., Ltd., Osaka (JP)

(72) Inventors: Hidetaka Sugaya, Shiga (JP); Tomoki Masuda, Osaka (JP); Hidetomo Nagahara, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 242 days.

(21) Appl. No.: 16/144,569

(22) Filed: Sep. 27, 2018

(65) Prior Publication Data
US 2019/0025102 A1 Jan. 24, 2019

Related U.S. Application Data

(63) Continuation of application No. PCT/JP2016/004900, filed on Nov. 16, 2016.

(30) Foreign Application Priority Data

Jun. 9, 2016 (JP) .............................. JP2016-114982
Oct. 7, 2016 (JP) .............................. JP2016-199512

(51) Int. Cl.
*G01F 1/66* (2006.01)
*G10K 11/02* (2006.01)
(Continued)

(52) U.S. Cl.
CPC .............. *G01F 1/662* (2013.01); *B06B 1/067* (2013.01); *B06B 1/0607* (2013.01); *G10K 11/02* (2013.01); *H04R 17/00* (2013.01); *B06B 2201/70* (2013.01)

(58) Field of Classification Search
CPC ....... G01F 1/662; B06B 1/0607; B06B 1/067; B06B 2201/70; G10K 11/02; H04R 17/00
(Continued)

(56) References Cited

U.S. PATENT DOCUMENTS 4,976,150 A * 12/1990 Deka .................. G01N 29/2437
73/644
5,093,810 A * 3/1992 Gill ...................... G10K 11/002
367/1
(Continued)

FOREIGN PATENT DOCUMENTS

CN 1373348 A 10/2002
CN 110256715 A * 9/2019
(Continued)

OTHER PUBLICATIONS

Zaldivar (R. J. Zaldivar, A. Labatete-Goeppinger, M. P. Easton, D. N. Patel, Degradation of radiation exposed polymethacrylamide (Rohacell® 31) foam used in composite hardware, Journal of Applied Polymer Science, 10.1002/app.44670, 134, 14, (2016); "Zaldivar"). (Year: 2016).*
(Continued)

*Primary Examiner* — Herbert K Roberts
*Assistant Examiner* — Monica S Young
(74) *Attorney, Agent, or Firm* — McDermott Will & Emery LLP

(57) ABSTRACT

A multilayer body includes a piezoelectric body and a first acoustic matching layer in direct or indirect contact with the piezoelectric body. The first acoustic matching layer includes a plastic foam containing a plurality of closed pores. An average pore size of the closed pores is not smaller than 1 μm and not larger than 100 μm. The first acoustic matching layer has a density of not less than 10 kg/m³ and not more than 100 kg/m³.

12 Claims, 3 Drawing Sheets

(51) Int. Cl.
   *H04R 17/00*   (2006.01)
   *B06B 1/06*   (2006.01)

(58) Field of Classification Search
   USPC .......................................................... 73/861
   See application file for complete search history.

(56) References Cited

U.S. PATENT DOCUMENTS

| | | | | |
|---|---|---|---|---|
| 5,225,449 | A * | 7/1993 | Tada | C08J 9/02 |
| | | | | 521/149 |
| 7,612,485 | B2 * | 11/2009 | Sugiura | B06B 1/0648 |
| | | | | 310/324 |
| 2002/0124662 | A1 | 9/2002 | Suzuki et al. | |
| 2004/0113522 | A1 * | 6/2004 | Nagahara | G10K 11/02 |
| | | | | 310/326 |
| 2004/0113523 | A1 * | 6/2004 | Hashimoto | G10K 11/02 |
| | | | | 310/326 |
| 2004/0124746 | A1 * | 7/2004 | Suzuki | G01F 1/662 |
| | | | | 310/326 |
| 2005/0236932 | A1 * | 10/2005 | Nagahara | G01F 1/667 |
| | | | | 310/328 |
| 2007/0077442 | A1 * | 4/2007 | Scherble | C08J 9/142 |
| | | | | 428/473.5 |
| 2007/0273249 | A1 * | 11/2007 | Eckert | B06B 1/067 |
| | | | | 310/334 |

FOREIGN PATENT DOCUMENTS

| | | |
|---|---|---|
| JP | 2-177799 | 7/1990 |
| JP | 2008-167147 A | 7/2008 |
| WO | 2003/064981 | 8/2003 |

OTHER PUBLICATIONS

Rohacell 31HF specifications https://www.rohacell.com/product/peek-industrial/downloads/rohacell%20hf_2020_january.pdf (Year: 2020).*

Wayback Machine https:// rohacell.com Oct. 17, 2015 Rohacel 31HF (Year: 2015).*

International Search Report of PCT application No. PCT/JP2016/004900 dated Jan. 31, 2017.

English Translation of Chinese Search Report dated Sep. 8, 2020 for the related Chinese Patent Application No. 201680081004.4.

Extended European Search Report dated Jun. 17, 2019 issued in corresponding European Patent Application No. 16904547.3.

* cited by examiner

MULTILAYER BODY THAT INCLUDES PIEZOELECTRIC BODY

BACKGROUND

1. Technical Field

The present disclosure relates to a multilayer body including a piezoelectric body and an acoustic matching layer, an ultrasonic transducer, and an ultrasonic flowmeter.

2. Description of the Related Art

Recently, an ultrasonic flowmeter for measuring a time taken for an ultrasonic wave to travel through a propagation path, determining a moving speed of a fluid, and calculating a flow rate of the fluid has been utilized in gas meters, etc. In general, the ultrasonic flowmeter includes a piezoelectric vibrator, and detects an ultrasonic wave using the piezoelectric vibrator. In the case of the fluid being gas, because a difference in acoustic impedance between the gas and the piezoelectric vibrator is large, the ultrasonic wave propagating through the gas tends to be reflected at the interface between the piezoelectric vibrator and the gas. Taking into account the above point, an acoustic matching layer is often disposed at the interface between the piezoelectric vibrator and the gas with intent to make the ultrasonic wave enter the piezoelectric vibrator efficiently.

Japanese Patent No. 2559144 discloses materials that can be used as the acoustic matching layer. Japanese Patent No. 3552054 discloses an ultrasonic transducer including two acoustic matching layers.

SUMMARY

In the related-art ultrasonic transducer, because matching of acoustic impedance between the acoustic matching layer and a medium to which the ultrasonic wave is emitted is not sufficient, high sensitivity cannot be obtained. One non-limiting and exemplary embodiment provides a multilayer body including an acoustic matching layer with improved acoustic characteristics, an ultrasonic transducer, and an ultrasonic flowmeter.

In one general aspect, the techniques disclosed here feature a multilayer body includes a piezoelectric body and a first acoustic matching layer in direct or indirect contact with the piezoelectric body. The first acoustic matching layer includes a plastic foam containing a plurality of closed pores. An average pore size of the closed pores is not smaller than 1 μm and not larger than 100 μm. The first acoustic matching layer has a density of not less than 10 kg/m³ and not more than 100 kg/m³. A generic or specific embodiment of the present disclosure may be realized as a multilayer body, an ultrasonic transducer, ultrasonic flowmeter, a device, an apparatus, a system, a method, or any of combinations of two or more among them.

With the multilayer body, the ultrasonic transducer, and the ultrasonic flowmeter according to the present disclosure, a highly sensitive ultrasonic transducer and ultrasonic flowmeter can be realized because of including the acoustic matching layer with satisfactory acoustic characteristics.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
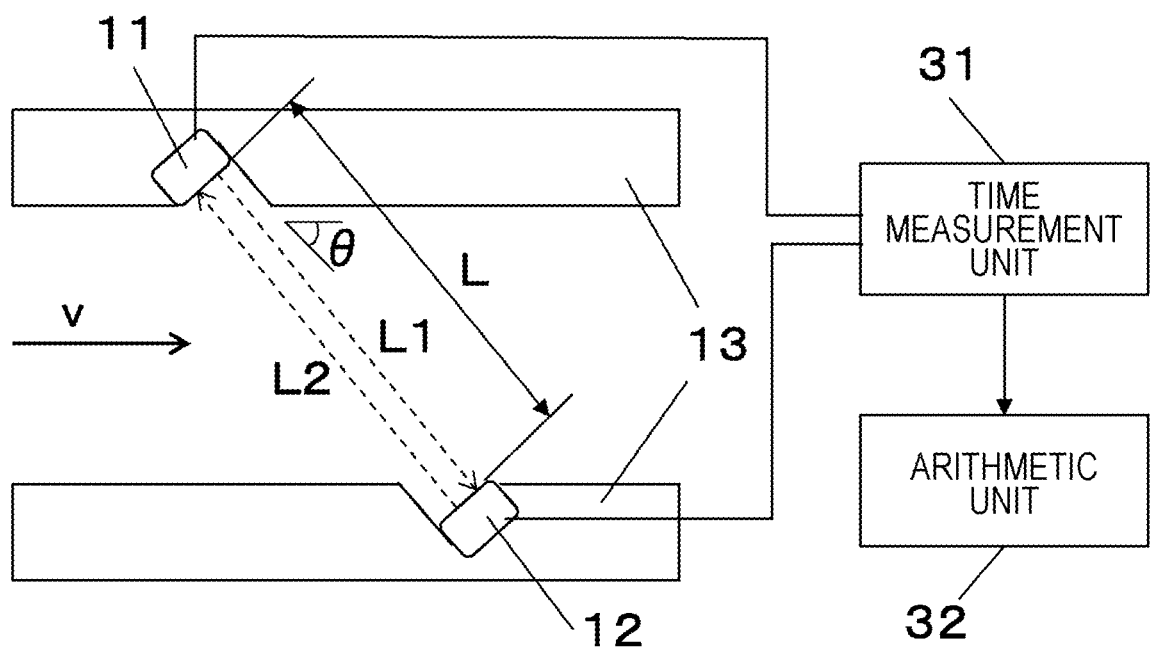
FIG. 1 is a block diagram of an embodiment of an ultrasonic flowmeter according to the present disclosure.

A multilayer body, an ultrasonic transducer, and an ultrasonic flowmeter according to the present disclosure are summarized as follows.

[Item 1]

A multilayer body comprising:
a piezoelectric body; and
a first acoustic matching layer arranged in direct or indirect contact with the piezoelectric body,
wherein the first acoustic matching layer includes a plastic foam containing a plurality of closed pores,
an average pore size of the closed pores is not smaller than 1 μm and not larger than 100 μm, and
the first acoustic matching layer has a density of not less than 10 kg/m³ and not more than 100 kg/m³.

[Item 2]

The multilayer body according to Item 1, wherein an acoustic impedance of the first acoustic matching layer is in a range of not less than $5 \times 10^3$ kg/s·m² and not more than $350 \times 10^3$ kg/s·m².

[Item 3]

The multilayer body according to Item 1 or 2, wherein an average distance between the adjacent closed pores is not shorter than 50 nm and not longer than 1 μm.

[Item 4]

The multilayer body according to any one of Items 1 to 3, wherein an acoustic velocity in the first acoustic matching layer is not lower than 500 m/s.

[Item 5]

The multilayer body according to any one of Items 1 to 4, wherein the plastic foam is a polymethacrylimide foam.

[Item 6]

The multilayer body according to any one of Items 1 to 5, wherein a thickness of the first acoustic matching layer is substantially equal to ¼ of a wavelength λ of an acoustic wave propagating in the first acoustic matching layer.

[Item 7]

The multilayer body according to any one of Items 1 to 6, further comprising a second acoustic matching layer disposed between the piezoelectric body and the first acoustic matching layer, wherein the second acoustic matching layer has a density being not less than 50 kg/m³ and not more than 1500 kg/m³ and being larger than the density of the first acoustic matching layer.

[Item 8]

The multilayer body according to Claim 7, wherein a relation between an acoustic impedance Za of the first acoustic matching layer and an acoustic impedance Zb of the second acoustic matching layer satisfies Za<Zb.

[Claim 9]

The multilayer body according to Item 7 or 8, wherein a thickness of the second acoustic matching layer is substantially equal to ¼ of a wavelength λ of an acoustic wave propagating in the second acoustic matching layer.

[Item 10]

The multilayer body according to any one of Items 1 to 6, wherein the first acoustic matching layer is directly bonded to the piezoelectric body.

[Item 11]

The multilayer body according to Item 7, wherein the second acoustic matching layer is arranged in direct contact with the first acoustic matching layer and the piezoelectric body.

[Item 12]

The multilayer body according to Item 7, further comprising a structural support layer having a density of not less than 1000 kg/m³ between the first acoustic matching layer and the second acoustic matching layer.

[Item 13]

The multilayer body according to Item 12, wherein a thickness of the structural support layer is less than ⅛ of a wavelength λ of an acoustic wave propagating in the structural support layer.

[Item 14]

An ultrasonic transducer comprising the multilayer body according to any one of Items 1 to 13.

[Item 15]

An ultrasonic transducer comprising:
the multilayer body according to any one of Items 1 to 6; and
a casing including a main body having an inverted-cup-like shape and equipped with a top plate, and a cover plate covering an opening of the inverted-cup-like shape,
wherein the piezoelectric body is disposed inside the inverted-cup-like shape and is fixed to an inner surface of the top plate, and
the first acoustic matching layer is fixed to an outer surface of the top plate.

[Item 16]

An ultrasonic transducer comprising:
the multilayer body according to any one of Claims 7 to 9; and
a casing including a main body having an inverted-cup-like shape and equipped with a top plate, and a cover plate covering an opening of the inverted-cup-like shape,
wherein the piezoelectric body is disposed inside the inverted-cup-like shape and is fixed to an inner surface of the top plate,
the second acoustic matching layer is fixed to an outer surface of the top plate, and
the first acoustic matching layer is in contact with the second acoustic matching layer.

[Item 17]

The ultrasonic transducer according to Item 15 or 16, wherein the casing is made of a metal material.

[Item 18]

An ultrasonic flowmeter comprising:
a flow passage through which a fluid to be measured flows;
a pair of ultrasonic transducers disposed in the flow passage and transmitting and receiving an ultrasonic signal, each of the ultrasonic transducers being the ultrasonic transducer according to any one of Items 14 to 16;
a time measurement unit that measures an ultrasonic-wave propagation time between the pair of ultrasonic transducers; and
an arithmetic unit that calculates a flow rate of the fluid in the flow passage on basis of a signal sent from the time measurement unit.

Embodiments of the multilayer body, the ultrasonic transducer, and the ultrasonic flowmeter according to the present disclosure will be described in detail below with reference to the drawings.

First Embodiment

Examples of the ultrasonic transducer and the ultrasonic flowmeter according to a first embodiment will be described in detail below.

Configuration of Ultrasonic Flowmeter

FIG. 1 is a block diagram of an embodiment of an ultrasonic flowmeter according to the present disclosure. As illustrated in FIG. 1, the ultrasonic flowmeter includes a flow passage through which a fluid to be measured flows, a pair of ultrasonic transducers 11 and 12 disposed in the flow passage, a time measurement unit 31, and an arithmetic unit 32. The fluid flows through the flow passage, which is defined by a pipe wall 13, at a flow velocity V in a direction denoted by an arrow in the drawing. A flow rate of the fluid flowing through the flow passage is measured. The pair of ultrasonic transducers (first and second ultrasonic transducers) 11 and 12 are disposed at the pipe wall 13 in an opposing relation. Each of the ultrasonic transducers 11 and 12 includes a piezoelectric vibrator made of a piezoelectric ceramic, i.e., an electrical energy/mechanical energy conversion element, and exhibits resonance characteristics as in a piezoelectric buzzer or a piezoelectric oscillator. First, the ultrasonic transducer 11 is used as an ultrasonic transmitter, and the ultrasonic transducer 12 is used as an ultrasonic receiver. When the time measurement unit 31 applies, to the piezoelectric vibrator of the ultrasonic transducer 11, an AC voltage with a frequency near a resonant frequency of the ultrasonic transducer 11, the ultrasonic transducer 11 emits an ultrasonic wave into the fluid inside a pipe along a propagation path denoted by L1 in FIG. 1. The ultrasonic transducer 12 receives the ultrasonic wave having propagated through the fluid and converts the received ultrasonic wave to a voltage. Then, contrary to the above case, the ultrasonic transducer 12 is used as an ultrasonic transmitter, and the ultrasonic transducer 11 is used as an ultrasonic receiver. When the time measurement unit 31 applies, to the piezoelectric vibrator of the ultrasonic transducer 12, an AC voltage with a frequency near a resonant frequency of the ultrasonic transducer 12, the ultrasonic transducer 12 emits an ultrasonic wave into the fluid inside the pipe along a propagation path denoted by L2 in FIG. 1. The ultrasonic transducer 11 receives the ultrasonic wave having propagated through the fluid and converts the received ultrasonic wave to a voltage. Thus, each of the ultrasonic transducers 11 and 12 serves as a receiver and a transmitter.

In the ultrasonic flowmeter described above, if the AC voltage is applied continuously, it would be difficult to measure a propagation time of the ultrasonic wave because the ultrasonic wave is continuously emitted from the ultrasonic transducer. Therefore, a burst voltage signal with a pulse signal being a carrier wave is usually used as a driving voltage. When the time measurement unit 31 applies, to the ultrasonic transducer 11, the burst voltage signal for driving and the ultrasonic transducer 11 emits an ultrasonic burst signal, the ultrasonic burst signal propagates through the propagation path L1 having a distance L, and reaches the ultrasonic transducer 12 after a time t. In the ultrasonic transducer 12, only the incoming ultrasonic burst signal can be converted to an electrical burst signal at a high S/N ratio. The time measurement unit 31 electrically amplifies the electrical burst signal and applies the amplified electrical burst signal to the ultrasonic transducer 11 again, thus causing the ultrasonic burst signal to be emitted. That type of device is called a sing-around device. The time required for the ultrasonic pulse to propagate through the propagation path and reach the ultrasonic transducer 12 after being emitted from the ultrasonic transducer 11 is called a sing-around period, and the inverse of the sing-around period is called a sing-around frequency. As illustrated in FIG. 1, it is assumed that a flow velocity of the fluid flowing inside the pipe is denoted by V, a velocity of the ultrasonic wave in the fluid is denoted by C, and an angle formed between a flowing direction of the fluid and a propagation direction of the ultrasonic pulse is denoted by θ. When the ultrasonic transducer 11 is used as the transmitter and the ultrasonic transducer 12 is used as the receiver, the following formula (1) is held on an assumption that the single-around period, i.e., the ultrasonic-wave propagation time taken for the ultrasonic pulse emitted from the ultrasonic transducer 11 to reach the ultrasonic transducer 12, is denoted by t1, and the sing-around frequency is denoted by f1.

$$f1 = 1/t1 = (C + V \cos \theta)/L \qquad (1)$$

On the other hand, when the ultrasonic transducer 12 is used as the transmitter and the ultrasonic transducer 11 is used as the receiver, the following formula (2) is held on an assumption that the single-around period, i.e., the ultrasonic-wave propagation time, is denoted by t2, and the sing-around frequency is denoted by f2.

$$f2 = 1/t2 = (C - V \cos \theta)/L \qquad (2)$$

Accordingly, a frequency difference Δf between both the sing-around frequencies is expressed by the following formula (3), and the flow velocity V of the fluid can be determined from the distance L of the propagation path of the ultrasonic wave and the frequency difference Δf.

$$\Delta f = f1 - f2 = 2V \cos \theta / L \qquad (3)$$

It is hence possible to determine the flow velocity V of the fluid from the distance L of the propagation path of the ultrasonic wave and the frequency difference Δf, and to check a flow rate of the fluid from the flow velocity V.

The ultrasonic flowmeter includes the time measurement unit 31 and arithmetic unit 32. The time measurement unit 31 includes a driving circuit that produces the burst voltage signals for driving the ultrasonic transducers 11 and 12, and a reception circuit for electrically amplifying the electrical burst signals converted by the ultrasonic transducers 11 and 12. The time measurement unit 31 determines the single-around periods t1 and t2, i.e., the ultrasonic-wave propagation times, through the above-described procedures. The arithmetic unit 32 calculates the flow velocity and the flow rate of the fluid from the determined single-around periods t1 and t2 and the relation expressed by the formula (3). The time measurement unit 31 and the arithmetic unit 32 are constituted, for example, by one or more microcomputers, one or more memories, and one or more programs. The programs are stored in the memory and specify the procedures to carry out the above-described arithmetic operations. The time measurement unit 31 and the arithmetic unit 32 may be partly constituted by electronic circuitry, etc.

Ultrasonic Transducer

Figure 2:
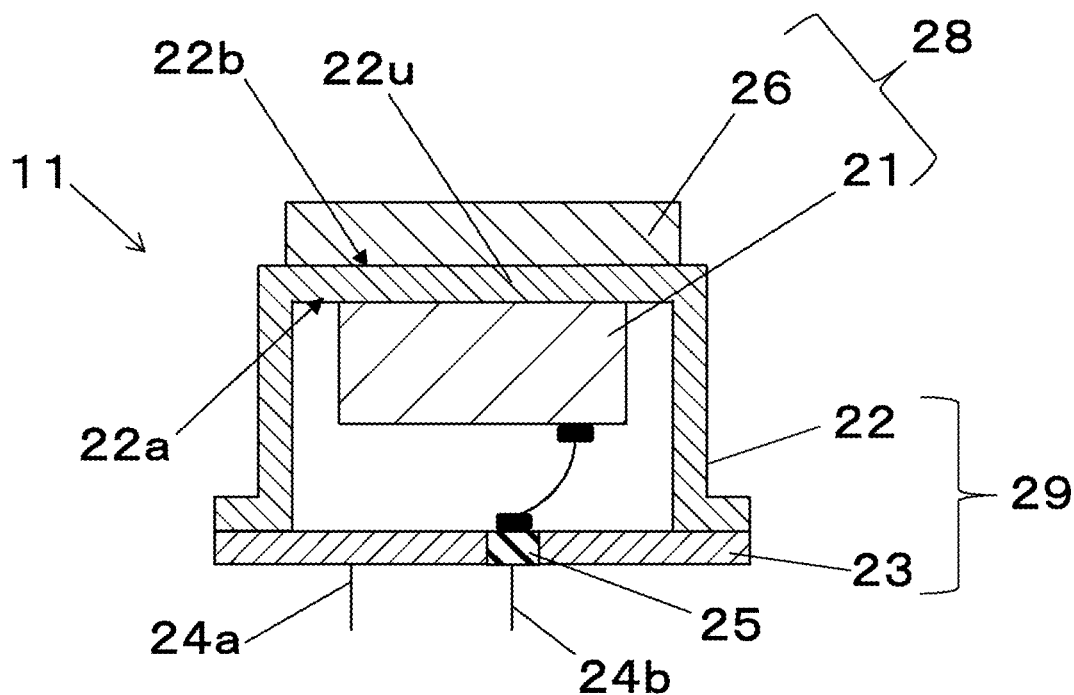
FIG. 2 is a schematic sectional view illustrating a first embodiment of a multilayer body and an ultrasonic transducer according to the present disclosure.

FIG. 2 is a sectional view illustrating an example of the ultrasonic transducer 11 used in the ultrasonic flowmeter according to the present disclosure. The ultrasonic transducer 12 has the same structure as that of the ultrasonic transducer 11. The ultrasonic transducer 11 includes a multilayer body 28 and a casing 29.

The multilayer body 28 includes a piezoelectric body 21 and a first acoustic matching layer 26. The first acoustic matching layer 26 is in contact with the piezoelectric body 21 directly or indirectly with another layer interposed therebetween. The piezoelectric body 21 is made of a piezoelectric ceramic or single crystal, and is polarized in a thickness direction. Electrodes are disposed on upper and lower surfaces of the piezoelectric body 21 in the thickness direction. The piezoelectric body 21 generates ultrasonic vibration upon application of a voltage to the electrodes.

The casing 29 includes a main body 22 having an inverted-cup-like shape and including a top plate 22u, and a cover plate 23. The main body 22 and the cover plate 23 are each made of a conductive material, such as a metal, which can ensure structural reliability against the fluid on the outer side. The piezoelectric body 21 is positioned inside the main body 22 having the inverted-cup-like shape, and is bonded to an inner surface 22a of the top plate 22u. An opening positioned at the bottom of the main body 22 having the inverted-cup-like shape is covered with the cover plate 23, and an inner space of the main body 22 is sealed off. Thus, the casing 29 is shielded from gas and has high reliability because the piezoelectric body 21 inside the casing 29 does not deteriorate even with the ultrasonic transducer 11 being exposed to various kinds of fluids. Driving terminals 24a and 24b are attached to the cover plate 23. One driving terminal 24a of the two driving terminals 24a and 24b is electrically connected to the electrode on the upper surface of the piezoelectric body 21 through both the cover plate 23 and the main body 22. The other driving terminal 24b is electrically insulated from the cover plate 23 with the provision of an insulating material 25, and is electrically connected to the electrode on the lower surface of the piezoelectric body 21 inside the main body 22.

The first acoustic matching layer 26 transmits the ultrasonic wave into the fluid, or receives the ultrasonic wave having propagated through the fluid. The first acoustic matching layer 26 efficiently outputs, as the ultrasonic wave, mechanical vibration of the piezoelectric body 21 oscillated upon application of the driving AC voltage to a medium on the outer side, or efficiently transfers the arrived ultrasonic wave, as vibration, to the piezoelectric body 21. Thus, voltage is efficiently converted to the ultrasonic wave, and the ultrasonic wave is efficiently converted to voltage. The first acoustic matching layer 26 is bonded to an outer surface 22b of the top plate 22u of the main body 22.

Assuming that acoustic impedances of the piezoelectric body 21 and the fluid are denoted by Z1 and Z2, respectively, and that an ideal acoustic impedance demanded for the first acoustic matching layer 26 is denoted by Z3, the acoustic impedance Z3 is given by $Z3 = \sqrt{(Z1 \cdot Z2)}$. The acoustic impedance of the piezoelectric body 21 is about $30 \times 10^6$ kg/s·m², and the acoustic impedance of hydrogen is about 110 kg/s·m². By putting those numerical values into the above formula, $Z3=57\times10^3$ (kg/s·m²) is obtained. The acoustic impedance is defined by the following formula (4).

$$\text{acoustic impedance}=(\text{density})\times(\text{acoustic velocity}) \quad (4)$$

In this embodiment, the first acoustic matching layer 26 has a density of not less than 10 kg/m³ and not more than 100 kg/m³. The acoustic velocity in the first acoustic matching layer 26 is not lower than 500 m/s, and is desirably not lower than 500 m/s and not higher than 3500 m/s. By properly selecting values of the density and the acoustic velocity within the above ranges, the acoustic impedance of the first acoustic matching layer 26 can take a value within the range of not less than $5\times10^3$ kg/s·m² and not more than $350\times10^3$ kg/s·m².

A material suitable for the first acoustic matching layer 26 having the above-mentioned physical properties is, for example, a hard microporous body. In an example, the first acoustic matching layer 26 is made of a hard plastic foam containing independent bubbles (i.e., closed pores). Examples of the hard plastic foam include a polymethacrylimide foam. The polymethacrylimide foam is marketed under the trade name ROHACELL® from Roehm Gmbh & Co KG, and is commercially available from Daicel-Evonik Ltd. in Japan. The density of ROHACELL is within the range of not less than 10 kg/m³ and not more than 100 kg/m³ according to the publicized catalogue.

Figure 5:
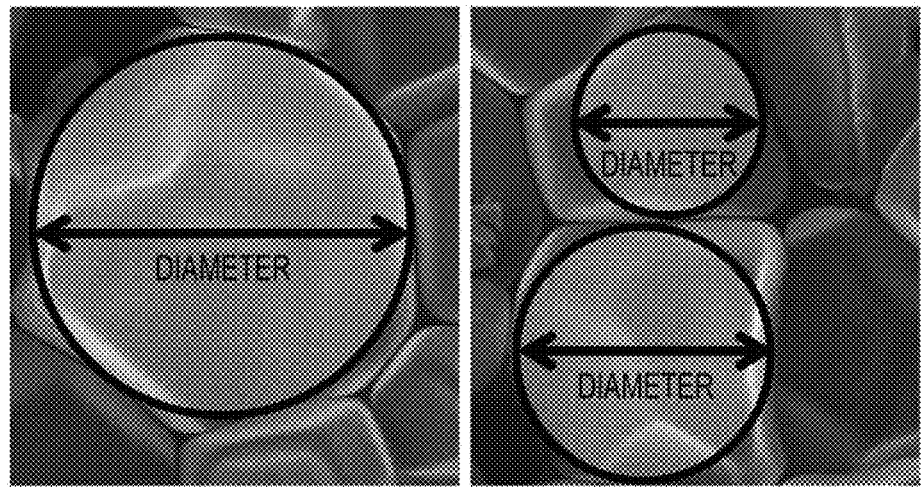
FIG. 5 shows an electron microscope photograph of a surface of a plastic foam.
Figure 6:
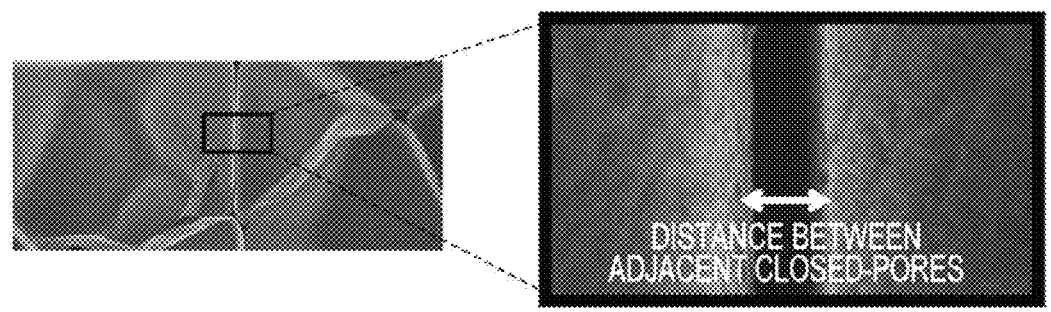
FIG. 6 shows an electron microscope photograph of the surface of the plastic foam on the left side, and a part of the photograph in an enlarged scale on the right side.

FIGS. 5 and 6 represent exemplary photographs of a surface of the plastic foam, the photographs being taken by a SEM (scanning electron microscope). In the photographs, a region appearing white represents a pore, i.e., an independent bubble (i.e., closed-pore), and a region appearing black between two closed-pores represents a partition wall (plastic). Accordingly, the distance between the adjacent closed-pores corresponds to a thinnest portion of the partition wall.

An average pore size of the closed-pores in the polymethacrylimide foam is desirably not smaller than 1 μm and not larger than 100 μm. Here, the pore size is defined as the diameter of an inscribed circle of each closed-pore when viewed in an observation field of the electron microscope (see FIG. 5). The average pore size is defined as an average value of the closed-pore sizes when viewed in an observation field of the electron microscope, the field including at least 100 closed-pores.

An average distance between the adjacent closed-pores is determined by measuring the distances between the adjacent closed-pores in an observation field of the electron microscope, the field including at least 10 closed-pores, and by averaging the measured distances (see FIG. 6). The distances between the adjacent closed-pores are desirably uniformly distributed within the range of not shorter than 50 nm and not longer than 1 μm.

According to simulations based on calculation and experimental results described later, the average pore size of the closed-pores and the average distance between the adjacent closed-pores affect acoustic propagation characteristics. Values of those parameters are desirably held within the above-mentioned ranges from the viewpoint of realizing good acoustic propagation characteristics. The average distance between the adjacent closed-pores corresponds to an average thickness of the partition walls of the closed-pores.

Furthermore, because of having a rigid and strong molecular structure, the polymethacrylimide foam is superior in mechanical strength and workability in comparison with other hard foams.

The first acoustic matching layer 26 desirably has a thickness of about ¼ of the wavelength λ of an acoustic wave propagating in the first acoustic matching layer 26. With that feature, the acoustic wave entering the piezoelectric body 21 after being reflected between two principal surfaces of the first acoustic matching layer 26 is weakened because the phase of the acoustic wave is shifted by ½. It is hence possible to reduce the intensity of the acoustic wave entering the piezoelectric body 21 after being delayed due to undesired reflection, and to suppress the influence of reflected waves.

In this embodiment, the top plate 22*u* of the casing 29 functions as a structural support layer for supporting the multilayer body 28. The top plate 22*u* desirably has a density of not less than 1000 kg/m³. A thickness of the top plate 22*u* is not more than ⅛ of the wavelength λ of an acoustic wave propagating in the top plate 22*u*. With the top plate 22*u* satisfying the above condition, reflection, etc. of the acoustic wave at the top plate 22*u* is suppressed.

Figure 3A:
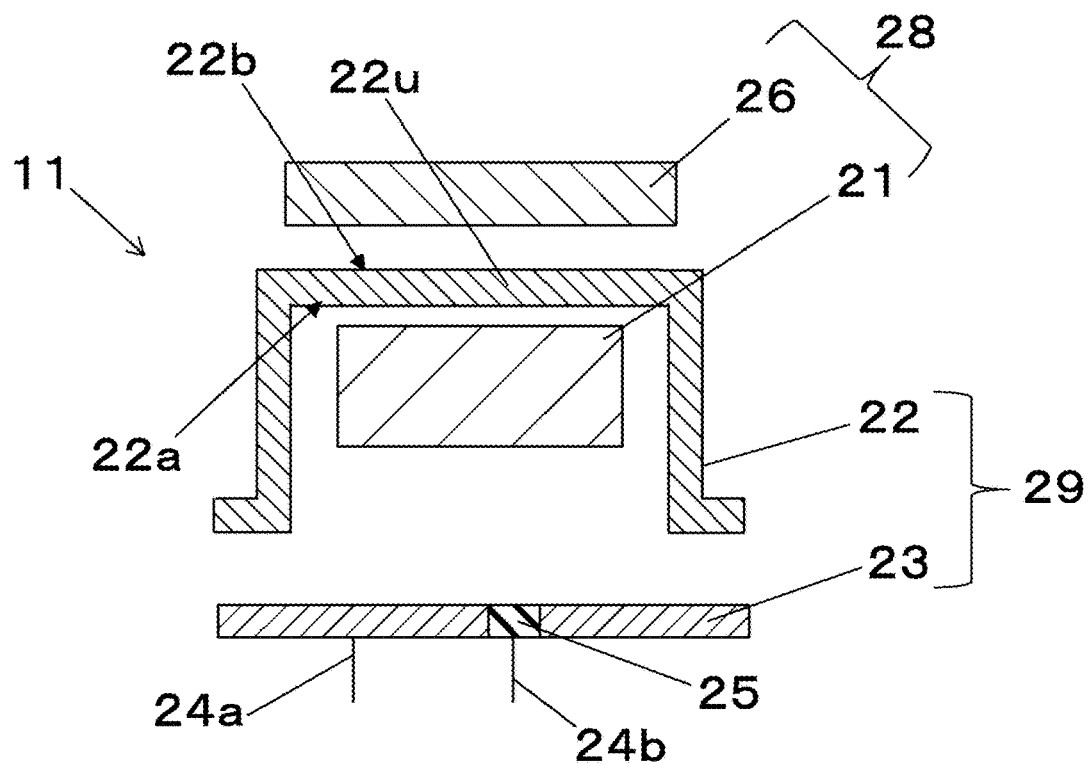
FIG. 3A is a sectional view illustrating a step of a manufacturing method for the ultrasonic transducer according to the first embodiment.
Figure 3B:
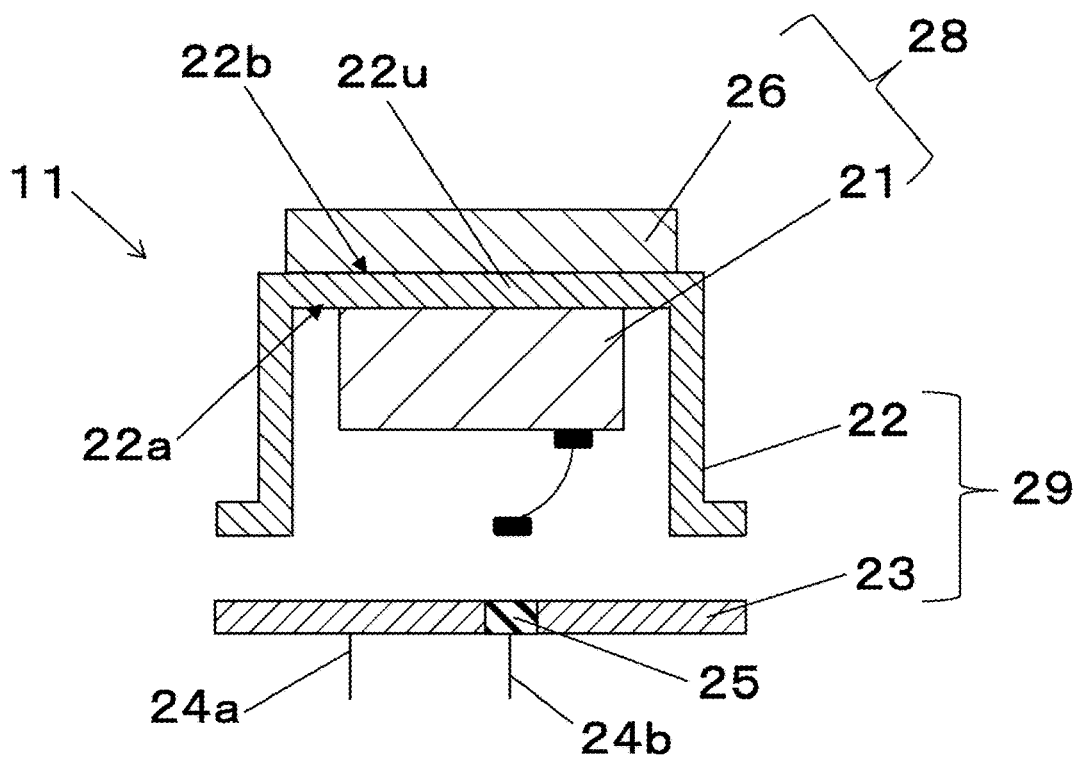
FIG. 3B is a sectional view illustrating a step of a manufacturing method for the ultrasonic transducer according to the first embodiment.

The ultrasonic transducer according to this embodiment can be manufactured, for example, through the following procedures. First, as illustrated in FIG. 3A, the casing 29, the piezoelectric body 21, and the first acoustic matching layer 26 are prepared. The first acoustic matching layer 26 is previously processed to have the desired thickness. The piezoelectric body 21 is bonded to the inner surface 22*a* of the top plate 22*u* in the main body 22 of the casing 29 using an adhesive, for example. The first acoustic matching layer 26 is bonded to the outer surface 22*b* of the top plate 22*u*. Then, as illustrated in FIG. 3B, connection between the piezoelectric body 21 and the driving terminal 24*b*, and so on are performed. Finally, the opening of the main body 22 is closed by the cover plate 23 using an adhesive, for example. The ultrasonic transducer is thus completed.

With the multilayer body according to this embodiment, since the first acoustic matching layer 26 has the density of not less than 10 kg/m³ and not more than 100 kg/m³, reflection of the ultrasonic wave attributable to the difference in acoustic impedance between the piezoelectric body emitting the ultrasonic wave and gas can be suppressed, and the ultrasonic wave can be caused to efficiently enter the piezoelectric body. Hence the ultrasonic transducer and the ultrasonic flowmeter having high sensitivity can be realized. In particular, with the features that the first acoustic matching layer 26 is constituted by a structural body including the closed-pores, the average pore size of the closed-pores is not smaller than 1 μm and not larger than 100 μm, and that the distances between the adjacent closed-pores are within the range of not shorter than 50 nm and not longer than 1 μm, good acoustic characteristics can be realized. Thus, the ultrasonic transducer and the ultrasonic flowmeter having even higher sensitivity can be realized. Furthermore, the structural body including the closed-pores and constituting the first acoustic matching layer 26 contains the polymethacrylimide foam. Since the polymethacrylimide foam is highly elastic in spite of having a low density, it has durability against impacts applied in the manufacturing process, and is superior in mechanical intensity and workability. Accordingly, the multilayer body and the ultrasonic transducer can be manufactured at a high yield. Thus, since the acoustic matching layer is comparatively easy to handle, it is possible to obtain the multilayer body that has high productivity, has smaller variation in characteristics, and allows the acoustic wave to efficiently enter the piezoelectric body from the fluid. Hence the ultrasonic transducer and the ultrasonic flowmeter being able to detect the fluid with high sensitivity can be realized using the above-described multilayer body.

Second Embodiment

Figure 4:
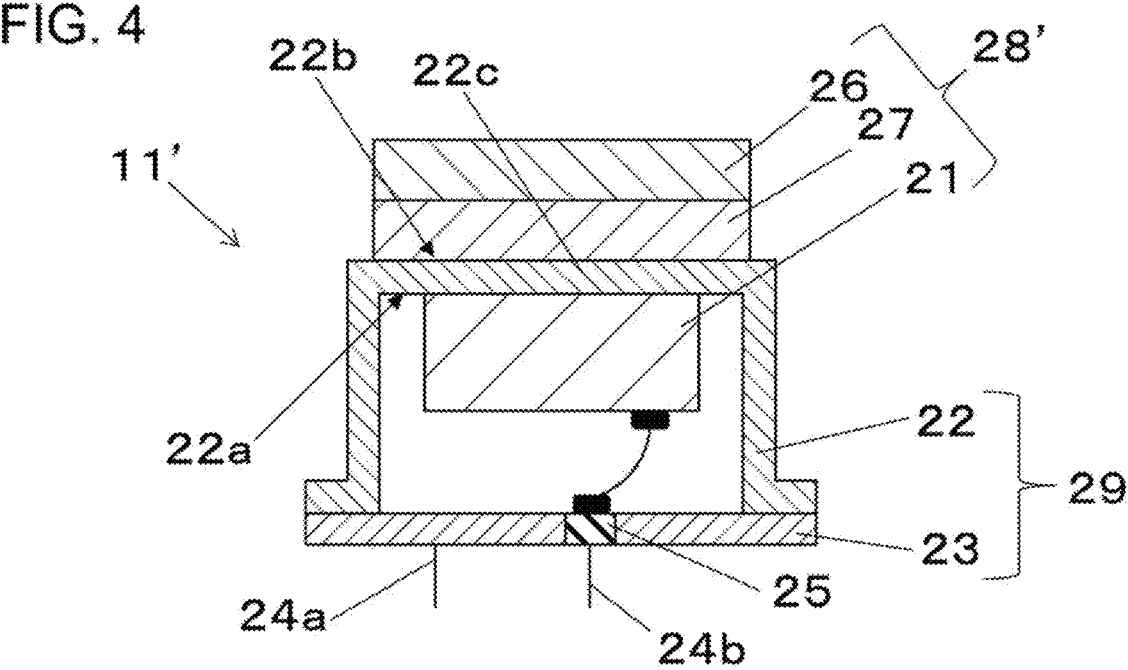
FIG. 4 is a schematic sectional view illustrating a second embodiment of the multilayer body and the ultrasonic transducer according to the present disclosure.

FIG. 4 illustrates a schematic structure of an ultrasonic transducer used in an ultrasonic flowmeter according to a second embodiment. In FIG. 4, the same or similar components as or to those in the first embodiment illustrated in FIG. 1 are denoted by the same reference signs. Description of the same or similar components as or to those in the first embodiment is omitted in some cases. The ultrasonic transducer illustrated in FIG. 4 is different from that in the first embodiment in including a multilayer body 28' which includes the piezoelectric body 21, the first acoustic matching layer 26, and a second acoustic matching layer 27.

The second acoustic matching layer 27 is positioned between the piezoelectric body 21 and the first acoustic matching layer 26. In this embodiment, the second acoustic matching layer 27 is bonded to the outer surface 22b of the top plate 22u, and the first acoustic matching layer 26 is in contact with the second acoustic matching layer 27. The second acoustic matching layer 27 has a density of not less than 50 kg/m³ and not more than 1500 kg/m³. The density of the second acoustic matching layer 27 is larger than that of the first acoustic matching layer 26. Assuming that an acoustic impedance of the first acoustic matching layer 26 is denoted by Za, and that an acoustic impedance of the second acoustic matching layer 27 is denoted by Zb, a relation of Za<Zb is satisfied. Zb is smaller than the acoustic impedance of the piezoelectric body 21. Since the multilayer body 28' further includes the second acoustic matching layer 27 having the above-mentioned acoustic characteristics, the acoustic wave having entered the first acoustic matching layer 26 can be caused to more efficiently enter the piezoelectric body 21.

The second acoustic matching layer 27 is a material containing the closed-pores. The second acoustic matching layer 27 is made of, for example, a foam resin such as polymethacrylimide, or a composite material. The composite material may be, for example, a material containing glass balloons (i.e., hollow minute glass balls) or plastic balloons, which are fixedly held in a resin material. The foam resin and the composite material may have a structure covered at its surface with a gas barrier film. A thickness of the second acoustic matching layer 27 is also desirably about ¼ of the wavelength λ of an acoustic wave propagating in the second acoustic matching layer 27 for the same reason described in the first embodiment.

In this embodiment, the first acoustic matching layer 26 and the second acoustic matching layer 27 are in direct contact with each other. The second acoustic matching layer 27 is in contact with the outer surface 22b of the top plate 22u of the casing 29. The top plate 22u of the casing 29 functions as a structural support layer for supporting the multilayer body 28'. The top plate 22u desirably has a density of not less than 1000 kg/m³. A thickness of the top plate 22u is not more than ⅛ of the wavelength λ of an acoustic wave propagating in the top plate 22u. With the top plate 22u satisfying the above condition, reflection, etc. of the acoustic wave at the top plate 22u is suppressed.

With the multilayer body according to this embodiment, since the multilayer body 28' includes the second acoustic matching layer 27, the acoustic wave propagating through the fluid can be caused to enter the piezoelectric body with higher efficiency. Hence the ultrasonic transducer and the ultrasonic flowmeter being able to detect the fluid with higher sensitivity can be realized in addition the features described above in the first embodiment.

EXAMPLES

The following description is made about processes of fabricating the ultrasonic transducers and the ultrasonic flowmeters according to the first and second embodiments, and results of checking characteristics thereof.

1. Preparation of Samples

Reference Example (A)

(a) Production of Second Acoustic Matching Layer (Silica Porous Body)

A spherical acrylic resin having a diameter of several ten μm and a sintered silica powder having a diameter of not more than 1 μm were mixed together and then molded under pressure. A resulting molding was dried and fired at 900° C., whereby a silica porous body was obtained. Thereafter, the second acoustic matching layer was obtained by adjusting the thickness of the silica porous body to be ¼ of the oscillation wavelength of an ultrasonic wave. The acoustic velocity of the ultrasonic wave of about 500 kHz propagating in the second acoustic matching layer was 1500 m/s. The second acoustic matching layer had a density of 570 kg/m³ and a thickness of 750 μm.

(b) Lamination of Second Acoustic Matching Layer and First Acoustic Matching Layer A gel material solution prepared by mixing tetramethoxysilane, ethanol, and an ammonia aqueous solution (0.1 N) at a molar ratio of 1:3:4 was coated in a thickness of 90 μm over the second acoustic matching layer that had been previously cleaned by plasma cleaning in a manner of making hydroxyl groups exposed at the surface of the second acoustic matching layer. A wet silica gel layer was then obtained by solidifying the coated gel material solution. An acoustic matching layer made of a dried silica gel laminated on the second acoustic matching layer was obtained by performing a hydrophobizing process on the second acoustic matching layer, including the wet silica gel layer formed thereon, in a hexane solution containing 5% by weight of tetramethoxysilane, and then by performing supercritical drying (12 MPa, 50° C.) with carbon dioxide. The first acoustic matching layer having high adhesion could be obtained because chemical bonding was formed by reaction between the hydroxyl groups on the second acoustic matching layer and alkoxy groups of the tetramethoxysilane. The acoustic velocity of the ultrasonic wave of about 500 kHz propagating in the first acoustic matching layer was 180 m/s, and the first acoustic matching layer had a density of 200 kg/m³.

(c) Bonding of Acoustic Matching Layer and Piezoelectric Body to Casing

Epoxy-based adhesive sheets were tentatively attached to both the sides of the top plate 22u of the main body 22 of the casing 29. Then, the piezoelectric body (e.g., piezoelectric layer) 21 and the second acoustic matching layer 27 were positioned to sandwich the top plate 22u and were bonded to the top plate 22u by curing the adhesive sheets under pressure and heating.

(d) Fabrication of Ultrasonic Transducer

The ultrasonic transducer was obtained by assembling the cover plate 23, the driving terminals 24a and 24b, etc. to the main body 22.

Example (B)

(a) Processing of First Acoustic Matching Layer

A polymethacrylimide hard plastic foam ROHACELL® (density: 30 kg/m³) was used as the first acoustic matching layer 26. This material had an average pore size of 60 μm and an average wall thickness of 80 nm, and was processed into a circular columnar shape having a diameter of 10.8 mm. The velocity of the ultrasonic wave of about 500 kHz propagating in the first acoustic matching layer 26 was 1200 m/s. The thickness of the first acoustic matching layer 26 was adjusted to 600 μm.

(b) Bonding of Acoustic Matching Layer and Piezoelectric Body to Casing

Epoxy-based adhesive sheets were tentatively attached to both the sides of the top plate 22*u* of the main body 22 of the casing 29. Then, the piezoelectric body 21 and the first acoustic matching layer 26 were positioned to sandwich the top plate 22*u* and were bonded to the top plate 22*u* by curing the adhesive sheets under pressure and heating.

(c) Fabrication of Ultrasonic Transducer

The ultrasonic transducer was obtained by assembling the cover plate 23, the driving terminals 24*a* and 24*b*, etc. to the main body 22.

Example (C)

(a) Processing of First Acoustic Matching Layer

A polymethacrylimide hard plastic foam ROHACELL® (density: 50 kg/m$^3$) was used as the first acoustic matching layer 26. This material had an average pore size of 40 μm and an average wall thickness of 200 nm, and was processed into a circular columnar shape having a diameter of 10.8 mm. The velocity of the ultrasonic wave of about 500 kHz propagating in the first acoustic matching layer 26 was 2000 m/s. The thickness of the first acoustic matching layer 26 was adjusted to 1000 μm.

(b) Bonding of Acoustic Matching Layer and Piezoelectric Body to Casing

Epoxy-based adhesive sheets were tentatively attached to both the sides of the top plate 22*u* of the main body 22 of the casing 29. Then, the piezoelectric body 21 and the first acoustic matching layer 26 were positioned to sandwich the top plate 22*u* and were bonded to the top plate 22*u* by curing the adhesive sheets under pressure and heating.

(c) Fabrication of Ultrasonic Transducer

The ultrasonic transducer was obtained by assembling the cover plate 23, the driving terminals 24*a* and 24*b*, etc. to the main body 22.

Example (D)

(a) Processing of First Acoustic Matching Layer

A polymethacrylimide hard plastic foam ROHACELL® (density: 70 kg/m$^3$) was used as the first acoustic matching layer 26. This material had an average pore size of 25 μm and an average wall thickness of 400 nm, and was processed into a circular columnar shape having a diameter of 10.8 mm. The velocity of the ultrasonic wave of about 500 kHz propagating in the first acoustic matching layer 26 was 3000 m/s. The thickness of the first acoustic matching layer 26 was adjusted to 1500 μm.

(b) Bonding of Acoustic Matching Layer and Piezoelectric Body to Casing

Epoxy-based adhesive sheets were tentatively attached to both the sides of the top plate 22*u* of the main body 22 of the casing 29. Then, the piezoelectric body 21 and the first acoustic matching layer 26 were positioned to sandwich the top plate 22*u* and were bonded to the top plate 22*u* by curing the adhesive sheets under pressure and heating.

(c) Fabrication of Ultrasonic Transducer

The ultrasonic transducer was obtained by assembling the cover plate 23, the driving terminals 24*a* and 24*b*, etc. to the main body 22.

Reference Example (E)

(a) Processing of First Acoustic Matching Layer

A polymethacrylimide hard plastic foam ROHACELL® (density: 70 kg/m$^3$) was used as the first acoustic matching layer 26. This material had an average pore size of 200 μm and an average wall thickness of 2000 nm, and was processed into a circular columnar shape having a diameter of 10.8 mm. The velocity of the ultrasonic wave of about 500 kHz propagating in the first acoustic matching layer 26 was 400 m/s. The thickness of the first acoustic matching layer 26 was adjusted to 200 μm.

(b) Bonding of Acoustic Matching Layer and Piezoelectric Body to Casing

Epoxy-based adhesive sheets were tentatively attached to both the sides of the top plate 22*u* of the main body 22 of the casing 29. Then, the piezoelectric body 21 and the first acoustic matching layer 26 were positioned to sandwich the top plate 22*u* and were bonded to the top plate 22*u* by curing the adhesive sheets under pressure and heating.

(c) Fabrication of Ultrasonic Transducer

The ultrasonic transducer was obtained by assembling the cover plate 23, the driving terminals 24*a* and 24*b*, etc. to the main body 22.

Reference Example (F)

(a) Processing of First Acoustic Matching Layer

A polymethacrylimide hard plastic foam ROHACELL® (density: 70 kg/m$^3$) was used as the first acoustic matching layer 26. This material had an average pore size of 300 μm and an average wall thickness of 3250 nm, and was processed into a circular columnar shape having a diameter of 10.8 mm. The velocity of the ultrasonic wave of about 500 kHz propagating in the first acoustic matching layer 26 was 460 m/s. The thickness of the first acoustic matching layer 26 was adjusted to 230 μm.

(b) Bonding of Acoustic Matching Layer and Piezoelectric Body to Casing

Epoxy-based adhesive sheets were tentatively attached to both the sides of the top plate 22*u* of the main body 22 of the casing 29. Then, the piezoelectric body 21 and the first acoustic matching layer 26 were positioned to sandwich the top plate 22*u* and were bonded to the top plate 22*u* by curing the adhesive sheets under pressure and heating.

(c) Fabrication of Ultrasonic Transducer

The ultrasonic transducer was obtained by assembling the cover plate 23, the driving terminals 24*a* and 24*b*, etc. to the main body 22.

Example (G)

(a) Production of Second Acoustic Matching Layer (Glass Epoxy) 27

Materials obtained by fixedly holding organic polymers, fibers of inorganic materials, foams, sintered porous bodies, glass balloons, or plastic balloons in resin materials, materials obtained by thermally compressing glass balloons, etc. can be used. Here, after filling glass balloons in a jig, the glass balloons were impregnated with an epoxy solution, and the epoxy solution was thermally cured at 120° C. The second acoustic matching layer 27 was obtained by cutting a cured molding to have a thickness equal to ¼ of the oscillation wavelength of an ultrasonic wave. The acoustic velocity of the ultrasonic wave of about 500 kHz propagating in the second acoustic matching layer 27 was 2500 m/s.

The second acoustic matching layer 27 had a density of 520 kg/m$^3$ and a thickness of 1250 μm.

(b) Bonding of Second Acoustic Matching Layer and Piezoelectric Body to Casing

Epoxy-based adhesive sheets were tentatively attached to both the sides of the top plate 22u of the main body 22 of the casing 29. Then, the piezoelectric body 21 and the second acoustic matching layer 27 were positioned to sandwich the top plate 22u and were bonded to the top plate 22u by curing the adhesive sheets under pressure and heating.

(c) Lamination of Second Acoustic Matching Layer 27 and First Acoustic Matching Layer 26

A polymethacrylimide hard plastic foam ROHACELL® (density: 30 kg/m$^3$) was used as the first acoustic matching layer 26. This material had an average pore size of 60 μm and an average wall thickness of 80 nm, and was processed into a circular columnar shape having a diameter of 10.8 mm. The velocity of the ultrasonic wave of about 500 kHz propagating in the first acoustic matching layer 26 was 1200 m/s, and the thickness of the first acoustic matching layer 26 was 600 μm. An epoxy resin was applied in a thickness of about 50 μm over the surface of the second acoustic matching layer 27. Thereafter, the first acoustic matching layer 26 was placed on the epoxy resin and was bonded to the second acoustic matching layer 27 under pressure and heating.

(d) Fabrication of Ultrasonic Transducer

The ultrasonic transducer was obtained by assembling the cover plate 23, the driving terminals 24a and 24b, etc. to the main body 22.

Example (H)

(a) Production of Second Acoustic Matching Layer (Glass Epoxy) 27

Materials obtained by fixedly holding organic polymers, fibers of inorganic materials, foams, sintered porous bodies, glass balloons, or plastic balloons in resin materials, materials obtained by thermally compressing glass balloons, etc. can be used. Here, after filling glass balloons in a jig, the glass balloons were impregnated with an epoxy solution, and the epoxy solution was thermally cured at 120° C. The second acoustic matching layer 27 was obtained by cutting a cured molding to have a thickness equal to ¼ of the oscillation wavelength of an ultrasonic wave. The acoustic velocity of the ultrasonic wave of about 500 kHz propagating in the second acoustic matching layer 27 was 2500 m/s. The second acoustic matching layer 27 had a density of 520 kg/m$^3$ and a thickness of 1250 μm.

(b) Bonding of Second Acoustic Matching Layer and Piezoelectric Body to Casing

Epoxy-based adhesive sheets were tentatively attached to both the sides of the top plate 22u of the main body 22 of the casing 29. Then, the piezoelectric body 21 and the second acoustic matching layer 27 were positioned to sandwich the top plate 22u and were bonded to the top plate 22u by curing the adhesive sheets under pressure and heating.

(c) Lamination of Second Acoustic Matching Layer 27 and First Acoustic Matching Layer 26

A polymethacrylimide hard plastic foam ROHACELL® (density: 30 kg/m$^3$) was used as the first acoustic matching layer 26. This material had an average pore size of 60 μm and an average wall thickness of 80 nm, and was processed into a circular columnar shape having a diameter of 10.8 mm. The acoustic velocity of the ultrasonic wave of about 500 kHz propagating in the first acoustic matching layer 26 was 1200 m/s. The thickness of the first acoustic matching layer 26 was 600 μm. An epoxy resin was applied in a thickness of about 150 μm over the surface of the second acoustic matching layer 27. Thereafter, the first acoustic matching layer 26 was placed on the epoxy resin and was bonded to the second acoustic matching layer 27 under pressure and heating.

(d) Fabrication of Ultrasonic Transducer

The ultrasonic transducer was obtained by assembling the cover plate 23, the driving terminals 24a and 24b, etc. to the main body 22.

Example (I)

(a) Production of Second Acoustic Matching Layer (Glass Epoxy) 27

Materials obtained by fixedly holding organic polymers, fibers of inorganic materials, foams, sintered porous bodies, glass balloons, or plastic balloons in resin materials, and materials obtained by thermally compressing glass balloons, etc. can be used. Here, after filling glass balloons in a jig, the glass balloons were impregnated with an epoxy solution, and the epoxy solution was thermally cured at 120° C. The second acoustic matching layer 27 was obtained by cutting a cured molding to have a thickness equal to ¼ of the oscillation wavelength of an ultrasonic wave. The acoustic velocity of the ultrasonic wave of about 500 kHz propagating in the second acoustic matching layer 27 was 2500 m/s. The second acoustic matching layer 27 had a density of 520 kg/m$^3$ and a thickness of 1250 μm.

(b) Bonding of Second Acoustic Matching Layer and Piezoelectric Body to Casing

Epoxy-based adhesive sheets were tentatively attached to both the sides of the top plate 22u of the main body 22 of the casing 29. Then, the piezoelectric body 21 and the second acoustic matching layer 27 were positioned to sandwich the top plate 22u and were bonded to the top plate 22u by curing the adhesive sheets under pressure and heating.

(c) Lamination of Second Acoustic Matching Layer 27 and First Acoustic Matching Layer 26

A polymethacrylimide hard plastic foam ROHACELL® (density: 50 kg/m$^3$) was used as the first acoustic matching layer 26. This material had an average pore size of 40 μm and an average wall thickness of 200 nm, and was processed into a circular columnar shape having a diameter of 10.8 mm. The acoustic velocity of the ultrasonic wave of about 500 kHz propagating in the first acoustic matching layer 26 was 2000 m/s, and the thickness of the first acoustic matching layer 26 was 100 μm. An epoxy resin was applied in a thickness of about 50 μm over the surface of the second acoustic matching layer 27. Thereafter, the first acoustic matching layer 26 was placed on the epoxy resin and was bonded to the second acoustic matching layer 27 under pressure and heating.

(d) Fabrication of Ultrasonic Transducer

The ultrasonic transducer was obtained by assembling the cover plate 23, the driving terminals 24a and 24b, etc. to the main body 22.

Example (J)

(a) Production of Second Acoustic Matching Layer (Glass Epoxy) 27

Materials obtained by fixedly holding organic polymers, fibers of inorganic materials, foams, sintered porous bodies, glass balloons, or plastic balloons in resin materials, and materials obtained by thermally compressing glass balloons, etc. can be used. Here, after filling glass balloons in a jig, the glass balloons were impregnated with an epoxy solution, and the epoxy solution was thermally cured at 120° C. The second acoustic matching layer 27 was obtained by cutting a cured molding to have a thickness equal to ¼ of the oscillation wavelength of an ultrasonic wave. The acoustic velocity of the ultrasonic wave of about 500 kHz propagating in the second acoustic matching layer 27 was 2500 m/s. The second acoustic matching layer 27 had a density of 520 kg/m$^3$ and a thickness of 1250 μm.

(b) Bonding of Second Acoustic Matching Layer and Piezoelectric Body to Casing

Epoxy-based adhesive sheets were tentatively attached to both the sides of the top plate 22u of the main body 22 of the casing 29. Then, the piezoelectric body 21 and the second acoustic matching layer 27 were positioned to sandwich the top plate 22u and were bonded to the top plate 22u by curing the adhesive sheets under pressure and heating.

(c) Lamination of Second Acoustic Matching Layer 27 and First Acoustic Matching Layer 26

A polymethacrylimide hard plastic foam ROHACELL® (density: 70 kg/m$^3$) was used as the first acoustic matching layer 26. This material had an average pore size of 25 μm and an average wall thickness of 400 nm, and was processed into a circular columnar shape having a diameter of 10.8 mm. The acoustic velocity of the ultrasonic wave of about 500 kHz propagating in the first acoustic matching layer 26 was 3000 m/s, and the thickness of the first acoustic matching layer 26 was 1500 μm. An epoxy resin was applied in a thickness of about 50 μm over the surface of the second acoustic matching layer 27. Thereafter, the first acoustic matching layer 26 was placed on the epoxy resin and was bonded to the second acoustic matching layer 27 under pressure and heating.

(d) Fabrication of Ultrasonic Transducer

The ultrasonic transducer was obtained by assembling the cover plate 23, the driving terminals 24a and 24b, etc. to the main body 22.

Reference Example (K)

(a) Production of Second Acoustic Matching Layer (Glass Epoxy) 27

Materials obtained by fixedly holding organic polymers, fibers of inorganic materials, foams, sintered porous bodies, glass balloons, or plastic balloons in resin materials, and materials obtained by thermally compressing glass balloons, etc. can be used. Here, after filling glass balloons in a jig, the glass balloons were impregnated with an epoxy solution, and the epoxy solution was thermally cured at 120° C. The second acoustic matching layer 27 was obtained by cutting a cured molding to have a thickness equal to ¼ of the oscillation wavelength of an ultrasonic wave. The acoustic velocity of the ultrasonic wave of about 500 kHz propagating in the second acoustic matching layer 27 was 2500 m/s. The second acoustic matching layer 27 had a density of 520 kg/m$^3$ and a thickness of 1250 μm.

(b) Bonding of Second Acoustic Matching Layer and Piezoelectric Body to Casing

Epoxy-based adhesive sheets were tentatively attached to both the sides of the top plate 22u of the main body 22 of the casing 29. Then, the piezoelectric body 21 and the second acoustic matching layer 27 were positioned to sandwich the top plate 22u and were bonded to the top plate 22u by curing the adhesive sheets under pressure and heating.

(c) Lamination of Second Acoustic Matching Layer 27 and First Acoustic Matching Layer 26

A polymethacrylimide hard plastic foam ROHACELL® (density: 70 kg/m$^3$) was used as the first acoustic matching layer 26. This material had an average pore size of 200 μm and an average wall thickness of 2000 nm, and was processed into a circular columnar shape having a diameter of 10.8 mm. The acoustic velocity of the ultrasonic wave of about 500 kHz propagating in the first acoustic matching layer 26 was 400 m/s, and the thickness of the first acoustic matching layer 26 was 200 μm. An epoxy resin was applied in a thickness of about 50 μm over the surface of the second acoustic matching layer 27. Thereafter, the first acoustic matching layer 26 was placed on the epoxy resin and was bonded to the second acoustic matching layer 27 under pressure and heating.

(d) Fabrication of Ultrasonic Transducer

The ultrasonic transducer was obtained by assembling the cover plate 23, the driving terminals 24a and 24b, etc. to the main body 22.

Reference Example (L)

(a) Production of Second Acoustic Matching Layer (Glass Epoxy) 27

Materials obtained by fixedly holding organic polymers, fibers of inorganic materials, foams, sintered porous bodies, glass balloons, or plastic balloons in resin materials, and materials obtained by thermally compressing glass balloons, etc. can be used. Here, after filling glass balloons in a jig, the glass balloons were impregnated with an epoxy solution, and the epoxy solution was thermally cured at 120° C. The second acoustic matching layer 27 was obtained by cutting a cured molding to have a thickness equal to ¼ of the oscillation wavelength of an ultrasonic wave. The acoustic velocity of the ultrasonic wave of about 500 kHz propagating in the second acoustic matching layer 27 was 2500 m/s. The second acoustic matching layer 27 had a density of 520 kg/m$^3$ and a thickness of 1250 μm.

(b) Bonding of Second Acoustic Matching Layer and Piezoelectric Body to Casing

Epoxy-based adhesive sheets were tentatively attached to both the sides of the top plate 22u of the main body 22 of the casing 29. Then, the piezoelectric body 21 and the second acoustic matching layer 27 were positioned to sandwich the top plate 22u and were bonded to the top plate 22u by curing the adhesive sheets under pressure and heating.

(c) Lamination of Second Acoustic Matching Layer 27 and First Acoustic Matching Layer 26

A polymethacrylimide hard plastic foam ROHACELL® (density: 70 kg/m$^3$) was used as the first acoustic matching layer 26. This material had an average pore size of 300 μm and an average wall thickness of 3250 nm, and was processed into a circular columnar shape having a diameter of 10.8 mm. The acoustic velocity of the ultrasonic wave of about 500 kHz propagating in the first acoustic matching layer 26 was 460 m/s, and the thickness of the first acoustic matching layer 26 was 230 μm. An epoxy resin was applied in a thickness of about 50 μm over the surface of the second acoustic matching layer 27. Thereafter, the first acoustic matching layer 26 was placed on the epoxy resin and was bonded to the second acoustic matching layer 27 under pressure and heating.

(d) Fabrication of Ultrasonic Transducer

The ultrasonic transducer was obtained by assembling the cover plate 23, the driving terminals 24a and 24b, etc. to the main body 22.

2. Evaluation of Characteristics

Sensitivities of the fabricated ultrasonic transducers were measured. Each pair of the fabricated ultrasonic transducers were arranged in an opposing relation, and an ultrasonic wave was transmitted and received using one of the ultrasonic transducers as a transmitter and the other ultrasonic transducer as a receiver. The measured sensitivity was obtained as a value normalized on the basis of the measurement result obtained in REFERENCE EXAMPLE (A). Brittleness and workability of the first acoustic matching layer were evaluated on the basis of volume elasticity modulus. More specifically, brittleness and workability were evaluated in terms of a value resulting from normalizing the volume elasticity modulus, which was indicated in the catalogue of the material used for the first acoustic matching layer, on the basis of the volume elasticity modulus of the material used in REFERENCE EXAMPLE (A). Table 1 lists those values and the characteristics of the first acoustic matching layer 26 and the second acoustic matching layer 27.

Signs x, Δ, ○ and ⊙ put in columns of performance evaluation in Table 1 were classified depending on ranges given below.

(Sensitivity)
x: less than 1
Δ: not less than 1 and less than 1.5
○: not less than 1.5 and less than 2
⊙: not less than 2

(Brittleness & Workability)
x: not more than 1
Δ: not less than 2 and less than 5
○: not less than 5 and less than 30
⊙: not less than 30

TABLE 1

| | | (A) | (B) | (C) | (D) | (E) | (F) | (G) | (H) | (I) | (J) | (K) | (L) |
|---|---|---|---|---|---|---|---|---|---|---|---|---|---|
| Evaluation of Performance | Sensitivity | Δ | ⊙ | ○ | Δ | X | X | ⊙ | ⊙ | ○ | ○ | X | X |
| | Brittleness & Workability | X | ○ | ⊙ | ⊙ | Δ | Δ | ○ | ○ | ⊙ | ⊙ | Δ | Δ |
| Structure of Acoustic Matching Layer | | Multiple Layers | Single Layer | Single Layer | Single Layer | Single Layer | Single Layer | Multiple Layers | Multiple Layers | Multiple Layers | Multiple Layers | Multiple Layers | Multiple Layers |
| | Sensor Sensitivity Value (relative ratio) | 1.0 | 2.2 | 1.6 | 1.2 | 0.2 | 0.1 | 2.5 | 2.1 | 1.9 | 1.5 | 0.3 | 0.2 |
| First Acoustic Matching Layer 26 | Density Kg/m$^3$ | 200 | 30 | 50 | 70 | 70 | 70 | 30 | 30 | 50 | 70 | 70 | 70 |
| | Acoustic Velocity m/s | 180 | 1200 | 2000 | 3000 | 400 | 460 | 1200 | 1200 | 2000 | 3000 | 400 | 460 |
| | Acoustic Impedance × 10$^3$ kg/m$^2$s | 36 | 36 | 100 | 210 | 28 | 32 | 36 | 36 | 100 | 210 | 28 | 32 |
| | Thickness μm | 90 | 600 | 1000 | 1500 | 200 | 230 | 600 | 600 | 1000 | 1500 | 200 | 230 |
| | Average Distance between Adjacent Closed-Pores nm | | 80 | 200 | 400 | 2000 | 3250 | 80 | 80 | 200 | 400 | 2000 | 3250 |
| | Average Pore Size μm | | 60 | 40 | 25 | 200 | 300 | 60 | 60 | 40 | 25 | 200 | 300 |
| | Volume Elasticity Modulus × 10$^4$ N/m$^2$ | 648 | 4320 | 20000 | 63000 | 1120 | 1481 | 4320 | 4320 | 20000 | 63000 | 1120 | 1481 |
| | Brittleness & Workability (larger value means better result) | 1 | 7 | 31 | 97 | 2 | 2 | 7 | 7 | 31 | 97 | 2 | 2 |
| Second Acoustic Matching Layer 27 | Density Kg/m$^3$ | 570 | | | | | | 520 | 520 | 520 | 520 | 520 | 520 |
| | Acoustic Velocity m/s | 1500 | | | | | | 2500 | 2500 | 2500 | 2500 | 2500 | 2500 |
| | Acoustic Impedance × 10$^3$ kg/m$^2$s | 855 | | | | | | 1300 | 1300 | 1300 | 1300 | 1300 | 1300 |
| | Thickness μm | 750 | | | | | | 1250 | 1250 | 1250 | 1250 | 1250 | 1250 |
| | Thickness of Adhesive Layer μm | | | | | | | 50 | 150 | 50 | 50 | 50 | 50 |

3. Review of Results

As seen from Table 1, the polymethacrylimide foam is superior in brittleness and workability in comparison with the silica porous body. From the relations between the average pore size and the sensitivity in EXAMPLES B to F, it is also seen that higher sensitivity is obtained when the average pore size is not more than 100 μm and the average thickness of the partition wall is not more than 1 μm. According to the results of detailed experiments conducted by the inventor of this application, the sensitivity of the ultrasonic transducer increases when the average pore size is not smaller than 1 μm and not larger than 100 μm and the average thickness of the partition wall is not smaller than 50 nm and not larger than 1 μm. It is further seen that higher sensitivity is obtained when the acoustic velocity in the first acoustic matching layer is higher than 500 m/s.

As seen from comparison between EXAMPLES G to L and EXAMPLES B to F, when the multilayer body further includes the second acoustic matching layer 27, higher sensitivity is obtained than when the multilayer body includes only the first acoustic matching layer 26.

The multilayer body and the ultrasonic transducer according to the present disclosure are suitably used in flowmeters for measuring various kinds of fluids. They are also suitably used in various types of devices having sonar performance, such as a detection device for seeking a target object and a ranging device for measuring the distance to a target object.

What is claimed is:

1. A multilayer body comprising: a piezoelectric body; and a first acoustic matching layer in direct or indirect contact with the piezoelectric body, wherein the first acoustic matching layer includes a plastic foam containing a plurality of closed pores, an average pore size of the closed pores is not smaller than 1 μm and not larger than 100 μm, the first acoustic matching layer has a density of not less than 10 kg/m$^3$ and not more than 100 kg/m$^3$, and an average distance between the adjacent closed pores is not shorter than 50 nm and not longer than 400 nm.

2. The multilayer body according to claim 1, wherein an acoustic impedance of the first acoustic matching layer is in a range of not less than 5×10$^3$ kg/s·m$^2$ and not more than 350×10$^3$ kg/s·m$^2$.

3. The multilayer body according to claim 1, wherein an acoustic velocity in the first acoustic matching layer is not lower than 500 m/s.

4. The multilayer body according to claim 1, wherein the plastic foam is a polymethacrylimide foam.

5. The multilayer body according to claim 1, wherein a thickness of the first acoustic matching layer is substantially equal to ¼ of a wavelength λ of an acoustic wave propagating in the first acoustic matching layer.

6. The multilayer body according to claim 1, further comprising a second acoustic matching layer disposed between the piezoelectric body and the first acoustic matching layer,
wherein the second acoustic matching layer has a density being not less than 50 kg/m$^3$ and not more than 1500 kg/m$^3$ and being larger than the density of the first acoustic matching layer.

7. The multilayer body according to claim 6, wherein a relation between an acoustic impedance Za of the first acoustic matching layer and an acoustic impedance Zb of the second acoustic matching layer satisfies Za<Zb.

8. The multilayer body according to claim 6, wherein a thickness of the second acoustic matching layer is substantially equal to ¼ of a wavelength λ of an acoustic wave propagating in the second acoustic matching layer.

9. The multilayer body according to claim 6, wherein the second acoustic matching layer is arranged in direct contact with the first acoustic matching layer and the piezoelectric body.

10. The multilayer body according to claim 6, further comprising a structural support layer having a density of not less than 1000 kg/m$^3$ between the first acoustic matching layer and the second acoustic matching layer.

11. The multilayer body according to claim 10, wherein a thickness of the structural support layer is less than ⅛ of a wavelength λ of an acoustic wave propagating in the structural support layer.

12. The multilayer body according to claim 1, wherein the first acoustic matching layer is directly bonded to the piezoelectric body.

* * * * *